(12) United States Patent
Ishikawa

(10) Patent No.: US 8,119,228 B2
(45) Date of Patent: Feb. 21, 2012

(54) POLYCARBONATE RESIN COMPOSITION, OPTICAL MOLDED BODY USING THE SAME, AND ILLUMINATION UNIT

(75) Inventor: Yasuhiro Ishikawa, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 447 days.

(21) Appl. No.: 12/299,121

(22) PCT Filed: Apr. 23, 2007

(86) PCT No.: PCT/JP2007/058712
§ 371 (c)(1),
(2), (4) Date: Oct. 31, 2008

(87) PCT Pub. No.: WO2007/129559
PCT Pub. Date: Nov. 15, 2007

(65) Prior Publication Data
US 2009/0185363 A1   Jul. 23, 2009

(30) Foreign Application Priority Data

May 1, 2006   (JP) .................................. 2006-127629
May 11, 2006  (JP) .................................. 2006-132978

(51) Int. Cl.
*C08L 69/00* (2006.01)

(52) U.S. Cl. ........ 428/220; 524/109; 524/128; 524/147; 524/153; 525/463; 525/464; 525/148; 362/629

(58) Field of Classification Search .................. None
See application file for complete search history.

(56) References Cited

U.S. PATENT DOCUMENTS

| 2007/0037906 A1* | 2/2007 | Kawato et al. ............... 524/154 |
| 2007/0213452 A1* | 9/2007 | Kawato et al. ............... 524/502 |
| 2009/0186208 A1* | 7/2009 | Ishikawa et al. .............. 428/220 |

FOREIGN PATENT DOCUMENTS

| JP | 63 89539      | 4/1988 |
| JP | 11 158364     | 6/1999 |
| JP | 2002 348367   | 12/2002 |
| JP | 2003 96179    | 4/2003 |
| JP | 2003 192780   | 7/2003 |
| JP | 2004 250557   | 9/2004 |
| JP | 2005 60628    | 3/2005 |
| WO | WO2005-035659 | * 4/2005 |
| WO | WO2005-100476 | * 10/2005 |

OTHER PUBLICATIONS

Machine translation of JP2002-348367.*
U.S. Appl. No. 12/299,216, filed Oct. 31, 2008, Ishikawa, et al.
U.S. Appl. No. 12/297,786, filed Oct. 20, 2008, Ishikawa.
U.S. Appl. No. 11/994,031, filed Dec. 27, 2007, Kawato, et al.
English Abstract of JP 2004 027107 (filed Jan. 29, 2004).
English Abstract of JP 2005 298710 (filed Oct. 27, 2005).

* cited by examiner

*Primary Examiner* — David Buttner
(74) *Attorney, Agent, or Firm* — Oblon, Spivak, McClelland, Maier & Neustadt, L.L.P.

(57) ABSTRACT

Disclosed are a polycarbonate resin composition obtained by blending a specific amount of an acrylic resin (B) having a specific viscosity average molecular weight or a specific amount of a polyorganosiloxane into a polycarbonate resin containing a polycarbonate copolymer (A) having repeating structural units represented by the general formulae (I) and (II) below and an optical molded body using the resin composition such as a light guide member. The polycarbonate resin composition enables to obtain a molded body having good light conductivity and being free from yellowing due to thermal deterioration, even when it is molded into a large-sized light guide member or light guide plate.

18 Claims, No Drawings

POLYCARBONATE RESIN COMPOSITION, OPTICAL MOLDED BODY USING THE SAME, AND ILLUMINATION UNIT

This application is a 371 of PCT/JP2007/058712, filed Apr. 23, 2007.

TECHNICAL FIELD

The present invention relates to a polycarbonate resin composition suitable for the production of an optical molded body such as a light guide member, and an optical molded body and an illumination unit each using the composition, and more specifically, to a polycarbonate resin composition (1) obtained by incorporating an acrylic resin as an essential ingredient into a polycarbonate copolymer having a specific repeating structural unit or a polycarbonate resin composition (2) obtained by blending the polycarbonate copolymer with specific amounts of, preferably, a polycarbonate resin except the polycarbonate copolymer and a polyorganosiloxane (D), an optical molded body (optical molded article) using one of the compositions and used in, for example, an optical device in a liquid crystal display field such as: a light guide member such as a light guide plate; or an optical lens, or a glass alternative application such as a street light cover or a laminated glass for vehicles and building materials, and an illumination unit using the light guide member.

BACKGROUND ART

A light guide plate is one of the optical members to be used in a backlight unit for any one of various display apparatuses. A polycarbonate resin (which may hereinafter be abbreviated as "PC") produced from bisphenol A has been used as a material for a light guide plate of a size as small as 1 to 7 inches. A PC produced from, for example, bisphenol A is suitable for a light guide plate to be mounted on, for example, a portable phone, a portable game machine, or a car navigation system because the PC is excellent in transparency and thermal resistance, has low hygroscopic property, and is excellent in mechanical characteristics and light conducting performance (see, for example, Patent Document 1).

In addition, an optical polycarbonate excellent in resistance to solder reflow has been known, and a light guide plate has been proposed as an application of the polycarbonate (see, for example, Patent Document 2).

In addition, a light guide plate is one of the optical members to be used in an illumination unit such as a backlight unit for any one of various display apparatuses, and an aromatic polycarbonate resin composition for a light guide plate obtained by blending an aromatic polycarbonate resin with a specific amount of a polyorganosiloxane having the following characteristics has been known (see, for example, Patent Document 3): the polyorganosiloxane has a phenyl group at any one of its side chains, has a branched siloxane structure, and has a specific kinetic viscosity at 25° C.

With the advent of reductions in thickness and size of a light source for use in an edge light type backlight, space savings based on a reduction in thickness have been demanded also of a light guide plate itself in recent years. However, when a polycarbonate resin composition described in Patent Document 1 or 2 is molded into a light guide plate by injection molding, it becomes difficult to achieve the target reduction in thickness of the light guide plate because the composition has low flowability.

In addition, in the case where a polycarbonate resin composition described in Patent Document 3 is used in a light guide plate, the light guide plate to be obtained has a good hue when the composition is molded at low temperature. However, when the temperature at which the composition is molded is increased in order that melt flowability sufficient for a reduction in thickness of a light guide plate may be secured, it becomes difficult to obtain a light guide plate having satisfactory performance owing to, for example, the following problem: the color tone of the light guide plate to be obtained on, in particular, a side opposite to the side on which light is incident becomes yellowish owing to the thermal deterioration of the carbonate resin of the composition, or a gas is generated at the time of the molding at high temperature. Accordingly, a molding resin material having the following characteristics has been requested: the material can be additionally reduced in thickness, and can be expanded into an additionally large size, as compared to a conventional material, and is excellent in light conducting performance.

By the way, a copolymer composed of α,α'-bis(4-hydroxyphenyl)-m-diisopropylbenzene and 2,2-bis(4-hydroxyphenyl)propane (bisphenol A) has been known (see, for example, Patent Document 4). Known applications of the copolymer are an optical lens (see, for example, Patent Documents 5 and 6) and an optical disk substrate (see, for example, Patent Document 7) because the copolymer has low water absorption property and low birefringence. At present, however, no material showing excellent light conducting performance and excellent moldability has been technically established yet.

Patent Document 1: JP 11-158364 A
Patent Document 2: JP 2005-60628 A
Patent Document 3: JP 2004-250557 A
Patent Document 4: JP 63-89539 A
Patent Document 5: JP 2003-192780 A
Patent Document 6: JP 2003-96179 A
Patent Document 7: JP 2002-348367 A

DISCLOSURE OF THE INVENTION

Problems to be Solved by the Invention

The present invention has been made with a view to solving the above-mentioned problems, and an object of the present invention is to provide a polycarbonate resin composition using a polycarbonate resin and having the following characteristics, and an optical molded body such as a light guide member and an illumination unit each using the resin composition: even when the composition is molded into an optical molded article (optical molded body) such as a large-sized light guide plate, a light guide member (optical molded article) such as a thin light guide plate which is free of yellowing due to the thermal deterioration of the resin, which does not show a reduction in its performance due to the generation of a gas, and which has good light conductivity and sufficient moldability can be obtained.

Means for Solving the Problems

The inventors of the present invention have made extensive studies with a view to solving the above-mentioned problems. As a result, the inventors have found that the above-mentioned problems can be solved with a polycarbonate resin composition (1) obtained by blending a polycarbonate resin containing a polycarbonate copolymer having a specific repeating structural unit with a specific amount of an acrylic resin (B) having a viscosity average molecular weight of 200 to 100,000 or a polycarbonate resin composition (2) obtained by blending a polycarbonate resin containing a polycarbonate copolymer having a specific repeating structural unit with a specific amount of a polyorganosiloxane (D). Thus, the inventors have completed the present invention.

In other words, the present invention provides:

(1) a polycarbonate resin composition (1) including a polycarbonate resin containing a polycarbonate copolymer (A) having repeating structural units represented by the following formulae (I) and (II) and an acrylic resin (B) having a viscosity average molecular weight of 200 to 100,000, the acrylic resin (B) being blended in an amount of 0.01 to 3 parts by mass into 100 parts by mass of the polycarbonate resin;

[Chem 1]

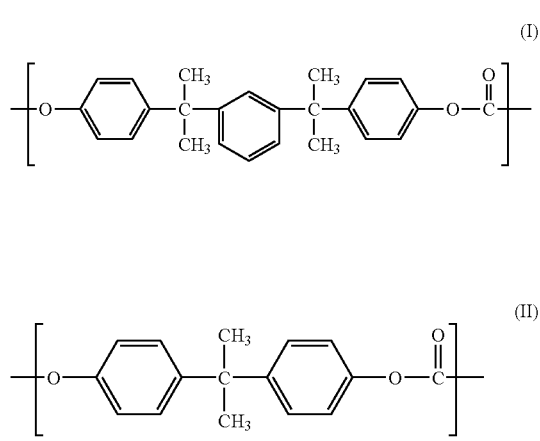

(2) the polycarbonate resin composition (1) according to the above item (1), in which the polycarbonate copolymer (A) has a viscosity number of 30 to 70;

(3) the polycarbonate resin composition (1) according to the above item (1) or (2), in which the repeating structural units each represented by the formula (I) and the repeating structural units each represented by the formula (II) are contained at a molar ratio of 1:99 to 50:50.

(4) the polycarbonate resin composition (1) according to any one of the above items (1) to (3), further including an alicyclic epoxy compound (C) in an amount of 0.01 to 1 part by mass and/or polysiloxane compound (D) having one or more kinds selected from an alkoxy group, a vinyl group, a phenyl group, and a biphenyl group in an amount of 0.01 to 3 parts by mass into 100 parts by mass of the polycarbonate resin;

(5) an optical molded article, which is obtained by molding the polycarbonate resin composition (1) according to any one of the above items (1) to (4);

(6) the optical molded article according to the above item (5), in which the optical molded article includes a light guide member;

(7) an illumination unit (a), including the optical molded article according to the above item (6) and a light source;

(8) a polycarbonate resin composition (2) including a polycarbonate resin containing a polycarbonate copolymer (A) having repeating structural units represented by the following formulae (I) and (II) and a polyorganosiloxane (D) having one or more kinds selected from an alkoxy group, a vinyl group, a phenyl group, and a biphenyl group, the polyorganosiloxane being blended in an amount of 0.01 to 1 part by mass into 100 parts by mass of the polycarbonate resin;

[Chem 2]

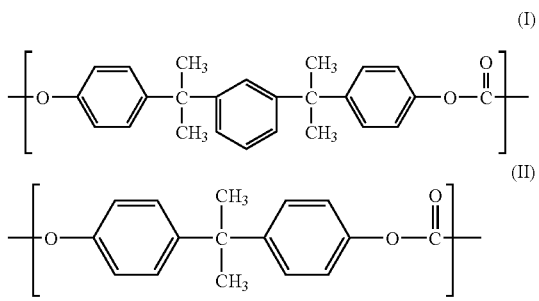

(9) the polycarbonate resin composition (2) according to the above item (8), in which the polycarbonate copolymer (A) has a viscosity number of 30 to 70;

(10) the polycarbonate resin composition (2) according to the above item (8) or (9), in which the polycarbonate copolymer (A) to be used contains the repeating structural units each represented by the formula (I) and the repeating structural units each represented by the formula (II) at a molar ratio of 1:99 to 99:1;

(11) the polycarbonate resin composition (2) according to any one of the above items (8) to (10), further including a phosphorus stabilizer (E) blended in an amount of 0.001 to 0.5 part by mass into 100 parts by mass of the polycarbonate resin;

(12) the polycarbonate resin composition (2) according to any one of the above items (8) to (11), further including an alicyclic epoxy compound (C) blended in an amount of 0.001 to 1 part by mass into 100 parts by mass of the polycarbonate resin;

(13) the polycarbonate resin composition (2) according to any one of the above items (8) to (12), further including an aromatic polycarbonate resin except the polycarbonate copolymer (A);

(14) the polycarbonate resin composition (2) according to any one of the above items (8) to (13), in which the polycarbonate resin composition has a viscosity number of 30 to 70;

(15) an optical molded body, which is obtained by molding the polycarbonate resin composition (2) according to any one of the above items (8) to (14);

(16) the optical molded body (2) according to the above item (15), in which the optical molded body includes a light guide member;

(17) the optical molded body according to the above item (16), in which the light guide member includes a light guide plate;

(18) the optical molded body according to the above item (17), in which the light guide plate has a thickness of 0.1 to 3 mm; and

(19) an illumination unit (b), including the optical molded body according to any one of the above items (16) to (18) and a light source.

Effects of the Invention

According to the present invention, there can be provided the polycarbonate resin compositions (1) and (2) each using a polycarbonate resin and each having the following characteristics, and an optical molded body such as a light guide member and an illumination unit each using one of the resin compositions: even when the composition is molded into an optical molded body such as a large-sized light guide plate, a molded body which is free of yellowing due to the thermal deterioration of the resin, which does not show a reduction in its performance due to the generation of a gas, and which has good light conductivity can be obtained.

BEST MODE FOR CARRYING OUT THE INVENTION

Hereinafter, a polycarbonate resin composition and the like of the present invention will be described in detail.

Polycarbonate Copolymer (A)

A polycarbonate copolymer (A) of which a polycarbonate resin composition (1) or (2) of the present invention is formed has repeating units represented by the following formulae (I) and (II).

[Chem 3]

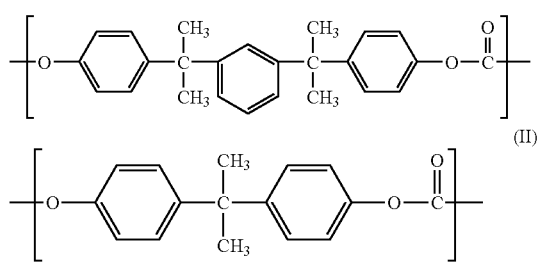

The copolymer can be produced by a conventional production method, that is, a production method referred to as an interfacial polymerization method or an ester exchange method.

To be specific, the copolymer can be produced by, for example, an interfacial polymerization method involving causing, in a solvent such as methylene chloride in the presence of a known acid acceptor such as sodium hydroxide or potassium hydroxide, or a known terminal terminator, and, furthermore, a branching agent added as required, a polycarbonate oligomer obtained by a reaction between 2,2-bis(4-hydroxyphenyl)propane represented by the following formula (III) (hereinafter referred to as "bisphenol A") and a carbonate precursor such as phosgene and α,α'-bis(4-hydroxyphenyl)-m-diisopropylbenzene represented by the following formula (IV) (hereinafter referred to as "bisphenol M") to react with each other.

[Chem 4]

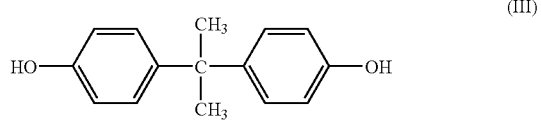

[Chem 5]

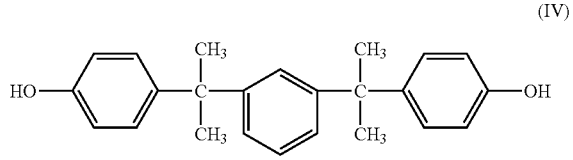

Alternatively, the copolymer can be produced by a polymerization method based on an ester exchange reaction between a carbonate precursor such as diphenyl carbonate and each of bisphenol A and bisphenol M.

Molar Ratio Between Repeating Structural Units Each Represented by Formula (I) and Repeating Structural Units Each Represented by Formula (II)

In the polycarbonate resin composition (1) of the present invention, a molar ratio between the repeating structural units each represented by the above formula (I) and the repeating structural units each represented by the above formula (II) is more preferably 1:99~99 to 50:50, or particularly preferably 1:99 to 30:70.

As long as the molar ratio between the repeating structural units each represented by the formula (I) and the repeating structural units each represented by the formula (II) in the polycarbonate resin composition (1) falls within the range of 1:99 to 50:50, the composition can satisfy mechanical physical properties and such flowability that the composition can be reduced in thickness, so the composition can be favorably molded into a thin or large-sized light guide plate.

In the polycarbonate copolymer (A) to be used in the polycarbonate resin composition (2) of the present invention, a molar ratio between the repeating structural units each represented by the above formula (I) and the repeating structural units each represented by the above formula (II) is preferably 1:99 to 99:1, or particularly preferably 1:99 to 30:70.

As long as the molar ratio in the polycarbonate copolymer (A) falls within the range, the composition can satisfy mechanical physical properties and desired melt flowability, so the composition can be favorably molded into a light guide member such as a thin or large-sized light guide plate.

Carbonyl Source

Phosgene used in a general interfacial polycondensation method for polycarbonate, triphosgene, bromophosgene, or the like can be used as a carbonyl source to be used in the production of the polycarbonate copolymer (A) to be used in the present invention. It should be noted that diallyl carbonate or the like can be used in the case of an ester exchange method while carbon monoxide or the like can be used in the case of an oxidative carbonylation method.

Terminal Terminator

Any one of various terminal terminators can be used in the production of the polycarbonate copolymer (A) to be used in the present invention as long as the terminal terminator is typically used in the polymerization of polycarbonate. In general, any one of the monohydric phenols can be used. Examples of the monohydric phenols to be used include phenol and phenols each having a linear or branched Gong-chain) alkyl group, an aliphatic polyester group, or an aromatic compound as a substituent. Specifically, o-, m-, p-cresol, p-tert-butylphenol, p-tert-amylphenol, p-tert-octylphenol, p-cumylphenol, p-methoxyphenol, p-phenylphenol, isooctylphenol, and monoalkyl phenols having a linear or branched alkyl group with an average carbon atom number of 12 to 35 at ortho-, meta-, or para-position, 9-(4-hydroxyphenyl)-9-(4-methoxyphenyl)fluorene, 9-(4-hydroxy-3-methylphenyl)-9-(4-methoxy-3-methylphenyl)-9-(4-methoxy-3-met hylphenyl)fluorene, 4-(1-adamantyl)phenol, and the like are exemplified. Of those, p-tert-butylphenol, p-cumylphenol, p-tert-octylphenylphenol, and phenol are preferable.

Branching Agent

Examples of the branching agent used in the production of the polycarbonate copolymer (A) include compounds having 3 or more functional groups: such as 1,1,1-tris(4-hydroxyphenyl)ethane;

4,4'-[1-[4-[1-(4-hydroxyphenyl)-1-methylethyl]phenyl]ethylidene]bisphenol; α,α', α''-tris(4-hydroxyphenyl)-1,3,5-triisopropylbenzene;

1-[α-methyl-α-(4'-hydroxyphenyl)ethyl]-4-[α',α'-bis(4''-hydroxyphenyl)ethyl]benzene; phloroglycine, trimellitic acid; and isatinbis(o-cresol).

Viscosity Number of Polycarbonate Resin Composition

The polycarbonate copolymer (A) to be used in the present invention has a viscosity number of preferably 30 to 70, that is, 10,000 to 28,000 in terms of a viscosity average molecular weight (Mv), or more preferably 34 to 62, that is, 12,000 to 24,000 in terms of Mv. The composition can be molded into, for example, a thin or large-sized light guide plate well as long as the copolymer has a viscosity number of 30 to 70.

In addition, the polycarbonate resin composition to be obtained in the present invention also desirably has a viscosity number similar to that described above, that is, 30 to 70, or preferably 34 to 62.

It should be noted that such viscosity number is a value measured in conformance with ISO 1628-4 (1999).

The above-mentioned polycarbonate copolymer (A) can be blended with an aromatic polycarbonate resin except the polycarbonate copolymer (A) depending on applications where the polycarbonate resin of the present invention is used and the shape of an article molded out of the composition from the viewpoint of a balance between the mechanical physical properties of the composition.

Examples of the aromatic polycarbonate resin include resins each produced by a conventional production method, that is, typically, a reaction between a dihydric phenol and a polycarbonate precursor such as phosgene or a carbonate compound. To be specific, for example, a resin produced by a reaction between a dihydric phenol and a carbonate precursor such as phosgene in a solvent such as methylene chloride in the presence of a known acid acceptor or terminal terminator (molecular weight modifier), and, furthermore, a branching agent added as required, or by an ester exchange reaction between a dihydric phenol and a carbonate precursor such as diphenyl carbonate can be used.

As the dihydric phenol to be used, various kinds of phenols are cited, in particular, 2,2-bis(4-hydroxyphenyl)propane (commonly called bisphenol A) is preferable. Examples of bisphenol other than bisphenol A include bis(hydroxyaryl) alkanes such as: bis(4-hydroxyphenyl)methane;
1,1-bis(4-hydroxyphenyl)ethane; 2,2-bis(4-hydroxyphenyl) butane;
2,2-bis(4-hydroxyphenyl)octane; 2,2-bis(hydroxyphenyl) phenylmethane;
2,2-bis(4-hydroxy-1-methylphenyl)propane;
bis(4-hydroxyphenyl)naphthylmethane; 1,1-bis(4-hydroxy-t-butylphenyl)propane;
2,2-bis(4-hydroxy-3-bromophenyl)propane;
2,2-bis(4-hydroxy-3,5-dimethylphenyl)propane;
2,2-bis(4-hydroxy-3-chlorophenyl)propane;
2,2-bis(4-hydroxy-3,5-dichlorophenyl)propane; and
2,2-bis(4-hydroxy-3,5-dibromophenyl)propane, bis(hydroxyaryl)cycloalkanes such as: 1,1-bis(4-hydroxyphenyl)cyclopentane; 1,1-bis(4-hydroxyphenyl)cyclohexane;
1,1-bis(4-hydroxyphenyl)-3,5,5-trimethylcyclohexane; and
2,2-bis(4-hydroxyphenyl)norbornene, dihydroxyarylethers such as:
4,4'-dihydroxyphenylether; and 4,4'-dihydroxy-3,3'-dimethylphenylether, dihydroxydiarylsulfides such as: 4,4'-dihydroxydiphenylsulfide; and
4,4'-dihydroxy-3,3'-dimethyldiphenylsulfide, dihydroxydiarylsulfoxides such as:
4,4'-dihydroxydiphenylsulfoxide; and
4,4'-dihydroxy-3,3'-dimethyldiphenylsulfoxide, dihydroxydiarylsulfones such as:
4,4'-dihydroxydiphenylsulfone; and 4,4'-dihydroxy-3,3'-dimethyldiphenylsulfone, dihydroxydiphenyls such as:
4,4'-dihydroxydiphenyl, dihydroxydiarylfluorenes such as: 9,9-bis(4-hydroxyphenyl)fluorene; and
9,9-bis(4-hydroxy-3-methylphenyl)fluorene,
bis(4-hydroxyphenyl)diphenylmethane, dihydroxydiaryladamantanes such as:
1,3-bis(4-hydroxyphenyl)adamantane; 2,2-bis(4-hydroxyphenyl)adamantane; and
1,3-bis(4-hydroxyphenyl)-5,7-dimethyladamantane, bis(4-hydroxyphenyl) diphenylmethane, 4,4'-[1,3-phenylenebis(1-methylethylidene)]bisphenol,
10,10-bis(4-hydroxyphenyl)-9-anthrone,
1,5-bis(4-hydroxyphenylthio)-2,3-dioxapentaene, and
α,ω-bishydroxyphenylpolydimethylsiloxane compounds.

These dihydric phenols can be used each alone or as a mixture of two or more kinds.

Examples of the carbonate compounds include diarylcarbonates such as diphenylcarbonate, dialkylcarbonates such as dimethylcarbonate and diethylcarbonate.

As the terminal terminator (molecular weight modifier), any kinds of modifiers that are usually used for polycarbonate polymerization can be used.

Specific examples of monohydric phenols include phenol, o-n-butylphenol, m-n-butylphenol, p-n-butylphenol, o-isobutylphenol, m-isobutylphenol, p-isobutylphenol, o-t-butylphenol, m-t-butylphenol, p-t-butylphenol, o-n-pentylphenol, m-n-pentylphenol, p-n-pentylphenol, o-n-hexylphenol, m-n-hexylphenol, p-n-hexylphenol, p-t-octylphenol, o-cyclohexylphenol, m-cyclohexylphenol, p-cyclohexylphenol, o-phenylphenol, m-phenylphenol, p-phenylphenol, o-n-nonylphenol, m-nonylphenol, p-n-nonylphenol, o-cumylphenol, m-cumylphenol, p-cumylphenol, o-naphthylphenol, m-naphthylphenol, p-naphthylphenol, 2,5-di-t-butylphenol, 2,4-di-t-butylphenol, 3,5-di-t-butylphenol, 2,5-dicumylphenol, 3,5-dicumylphenol, p-cresol, bromophenol, and tribromophenol.

Of those monohydric phenols, p-t-butylphenol, p-cumylphenol, p-t-octylphenol, phenol, and the like are preferably used.

On top of the foregoing, any one of those described above as branching agents for polycarbonate copolymers can be used as the branching agent.

In ordinary cases, the aromatic polycarbonate resin to be used in the present invention has a viscosity average molecular weight of preferably 10,000 to 100,000, or more preferably 12,000 to 40,000.

In addition, the ratio at which the polycarbonate copolymer (A) and the aromatic polycarbonate resin except the polycarbonate copolymer (A) are blended with each other in the polycarbonate resin of the present invention has only to be such that the content of the repeating structural units each represented by the formula (I) in the polycarbonate resin after the mixing can be adjusted to 1 to 99 mol %; the polycarbonate copolymer (A) and the aromatic polycarbonate resin are blended with each other at a mass ratio of preferably 100:0 to 30:70, or more preferably 100:0 to 40:60.

Acrylic Resin (B)

An acrylic resin (B) to be used in the polycarbonate resin composition (1) of the present invention is a polymer using at least one kind selected from monomer units including acrylic acid, an acrylate, acrylonitrile, and derivatives of them as a repeating unit, and is a homopolymer or a copolymer with, for example, styrene or butadiene. Specific examples of the polymer include polyacrylic acid, polymethyl methacrylate (PMMA), polyacrylonitrile, an ethyl acrylate-2-chloroethyl acrylate copolymer, an n-butyl acrylate-acrylonitrile copolymer, an acrylonitrile-styrene copolymer, an acrylonitrile-butadiene copolymer, and an acrylonitrile-butadiene-styrene copolymer. Of those, polymethyl methacrylate (PMMA) can be particularly suitably used.

The acrylic resin (B) has a viscosity average molecular weight of 200 to 100,000, or preferably 20,000 to 60,000. When the viscosity average molecular weight is 200 to 100,000, an article molded out of the composition can obtain sufficient transparency because the rate at which phase separation between each of the PC copolymer and the other PC resin and the acrylic resin proceeds at the time of the molding is not excessively high. A known product can be used as polymethyl methacrylate (PMMA); in ordinary cases, a product obtained by the bulk polymerization of a methyl methacrylate monomer in the presence of a peroxide and an azo polymerization initiator is preferable.

It should be noted that the viscosity average molecular weight is a value in terms of polystyrene measured by a gel permeation chromatography (GPC) method.

The acrylic resin is blended in an amount of 0.01 to 3 parts by mass, preferably 0.05 to 1 part by mass, or more preferably 0.1 to 0.5 part by mass into 100 parts by mass of the polycarbonate resin. When the amount in which the acrylic resin is blended is 0.01 part by mass or more, the transparency of an article molded out of the composition is improved. When the amount is 3.0 parts by mass or less, the transparency of the molded article can be maintained while none of the other desired physical properties of the molded article is impaired.

Alicyclic Epoxy Compound (C)

The composition of the present invention can be blended with an alicyclic epoxy compound (C) as required in order that the steam resistance (resistance to hydrolysis) and transparency of an article molded out of the composition may be improved.

That is, the alicyclic epoxy compound (C) to be used in the present invention means a cyclic aliphatic compound having an alicyclic epoxy group, that is, such an epoxy group that one oxygen atom is added to an ethylene bond in the aliphatic ring, and, specifically, a compound represented by any one of the following formulae (V) to (XIV) is suitably used.

[Chem 6]

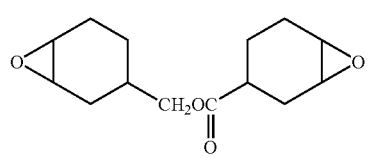

(V)

[Chem 7]

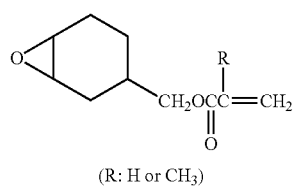

(VI)

(R: H or CH₃)

[Chem 8]

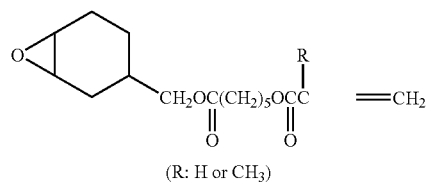

(VII)

(R: H or CH₃)

[Chem 9]

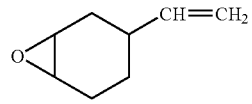

(VIII)

[Chem 10]

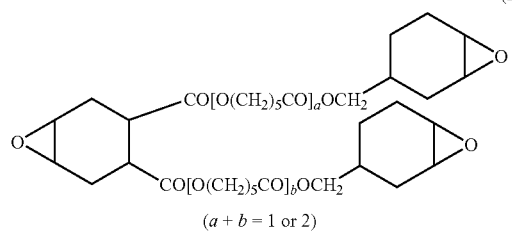

(IX)

($a + b = 1$ or $2$)

[Chem 11]

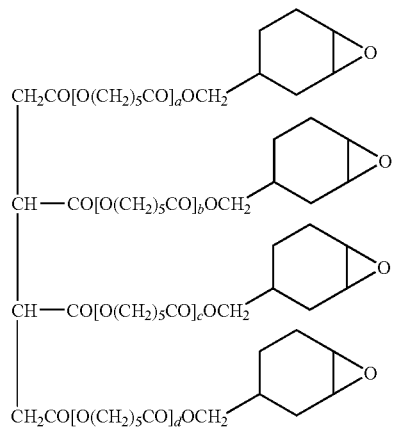

(X)

($a + b + c + d = 1$ to $3$)

[Chem 12]

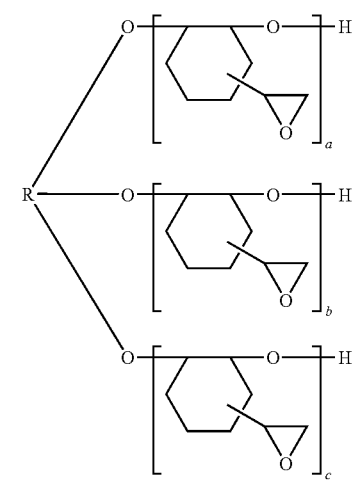

(XI)

($a + b + c = n$ (integer), R: hydrocarbon group)

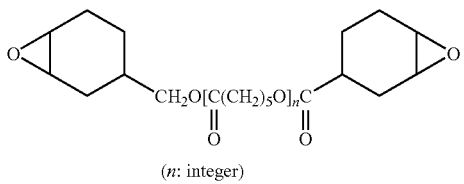

(XII)

(n: integer)

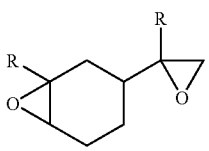

(R: hydrocarbon group)

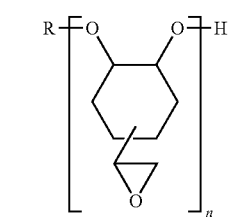

(n: integer, R: hydrocarbon group)

Of those, a compound represented by the formula (V), (X), or (XIV) is preferable because the compound is excellent in compatibility with the polycarbonate resin and does not impair the transparency of an article molded out of the composition.

The alicyclic epoxy compound (C) is blended in an amount of typically 0.001 to 1 part by mass, preferably 0.01 to 1 part by mass, more preferably 0.005 to 0.8 part by mass, still more preferably 0.01 to 0.5 part by mass, or particularly preferably 0.02 to 0.2 part by mass into 100 parts by mass of the polycarbonate resin. When the amount in which the compound is blended is 0.01 part by mass or more, the transparency and steam resistance of an article molded out of the composition are improved. In addition, when the amount is 1 part by mass or less, no phase separation between the polycarbonate resin and the compound occurs, and the transparency of the molded article is also good.

Polyorganosiloxane (D)

A polyorganosiloxane to be used in the polycarbonate resin composition (1) of the present invention as required or to be used as an essential ingredient in the polycarbonate resin composition (2) of the present invention has at least one kind of a group selected from a phenyl group, a diphenyl group, a vinyl group, and an alkoxy group, is preferably, for example, a reactive silicone compound (such as organosiloxane) obtained by introducing at least one kind of a group selected from a methoxy group, an ethoxy group, a vinyl group, and a phenyl group into a silicone compound, and is preferably a polyorganosiloxane having a kinetic viscosity at 25° C. of 1 to 1,000 mm$^2$/sec. Further, the polyorganosiloxane is preferably a polyorganosiloxane having a viscosity at 25° C. of 1 to 150 mm$^2$/sec when additionally high light conducting performance is requested of such composition. When the kinetic viscosity is excessively small, the amount of a low-molecular weight component in the polyorganosiloxane increases, so molding failures due to the generation of a gas at the time of the molding of the composition such as unloading, a gas burn, and a transfer failure may occur. When the kinetic viscosity exceeds 1,000 mm$^2$/sec, it becomes difficult to disperse the polyorganosiloxane in the polycarbonate resin, with the result that no improving effects on the light conducting performance and light diffusing performance of the resin composition to be obtained are obtained.

In addition, the polyorganosiloxane (D) has an additionally improving effect on the thermal stability of the composition at the time of the molding of the composition; for example, the polyorganosiloxane prevents an appearance failure such as yellowing due to the thermal deterioration of the resin of the composition at the time of the molding or a silver streak and the inclusion of an air bubble in the composition.

In the polycarbonate resin composition (1), the polyorganosiloxane is blended in an amount of typically 0.01 to 3 parts by mass, or preferably 0.02 to 1 part by mass into 100 parts by mass of the polycarbonate resin. When the amount in which the polyorganosiloxane is blended is 0.01 part by mass or more, the above blending sufficiently exerts an improving effect on the thermal stability of the composition. When the amount is 3 parts by mass or less, an article molded out of the composition does not undergo hazing or the like.

In addition, in the polycarbonate resin composition (2), the polyorganosiloxane is blended in an amount of 0.01 to 1 part by mass, preferably 0.02 to 0.8 part by mass, or more preferably 0.03 to 0.3 part by mass into 100 parts by mass of the polycarbonate resin. When the ratio at which the polyorganosiloxane is blended exceeds 1 part by mass, an influence on a reduction in impact resistance of the resin enlarges. When the amount in which the polyorganosiloxane is blended falls within the range, the thermal stability of the composition at the time of the molding of the composition is improved, so an article molded out of the composition does not undergo hazing or the like, and has a good hue.

Phosphorus Stabilizer (E)

A phosphorus stabilizer (E) to be used in the polycarbonate resin composition (2) of the present invention is, for example, a phosphoric acid compound and/or an aromatic phosphine compound.

Specific examples of the phosphate compounds include phosphorous acid, phosphoric acid, phosphonous acid, phosphonic acid, and esters thereof. Specific examples thereof include triphenylphosphite, tris(nonylphenyl)phosphite, tris (2,4-di-tert-butylphenyl)phosphite, tridecylphosphite, trioctylphopshite, trioctadecylphosphite, didecylmonophenyl phosphite, dioctylmonophenyl phosphite, diisoproplymonophenyl phosphite, momobutyldiphenyl phosphite, monodecyldiphenyl phosphite, monooctyldiphenyl phosphite, bis(2,6-di-tert-butyl-4-methylphenyl)pentaerythritol diphosphite, 2,2-methylenebis(4,6-di-tert-butylphenyl)octyl phosphite, bis(nonylphenyl)pentaerythritol diphosphite, bis (2,4-di-tert-butylphenyl)pentaerythritol diphosphite, distearyl pentaerythritol diphosphite, tributylphosphate, triethylphosphate, trimethylphosphate, triphenylphosphate, diphenyl monoorthoxenyl phosphate, dibutylphosphate, dioctylphosphiae, diisopropyl phosphate, 4,4'-biphenylene phosphinic acid tetrakis(2,4-di-tert-bitylphenyl), dimethyl benzene phosphonate, diethyl benzene phosphonate, and dipropyl benzene phosphonate.

Trisnonylphenylphosphite, trimethylphosphate, tris(2,4-di-tert-butylphenyl)phosphite and dimethyl benzene phosphonate are preferable.

As the aromatic phosphine compound, for example, an arylphosphine compound represented by the formula (P)

P—(X)$_3$    (P)

(in the formula, X represents a hydrocarbon group, at least one of which is an optionally substituted aryl group having 6 to 18 carbon atoms) is exemplified.

Examples of the arylphosphine compounds of the formula (P) include triphenylphosphine, diphenylbutylphosphine, diphenyloctadecylphosphine, tris-(p-tolyl)phosphine, tris-(p-nonylphenyl)phosphine, tris-(naphthyl)phosphine, diphenyl(hydroxymethyl)phosphine, diphenyl(acetoxymethyl) phosphine, diphenyl-(β-ethylcarboxyethyl)phosphine, tris-(p-chlorophenyl)phosphine, tris-(p-fluorophenyl)phosphine, diphenylbenzyl phosphine, diphenyl-β-cyanoethyl phosphine, diphenyl-(p-hydroxyphenyl)phosphine, diphenyl-1,4-dihydroxyphenyl-2-phosphine, and phenylnaphthylbenzyl phosphine. Of these compounds, particularly triphenylphosphine is preferably used.

One kind of the above-mentioned phosphorus stabilizers may be used alone, or two or more kinds of them may be used in combination. At least one kind of the above-mentioned phosphorus stabilizers is blended in a total amount of preferably 0.001 to 0.5 part by mass, more preferably 0.005 to 0.3 part by mass, or still more preferably 0.01 to 0.1 part by mass into 100 parts by mass of the polycarbonate resin. When the amount in which the phosphorus stabilizer is blended falls within the range, the thermal stability of the composition at the time of the molding of the composition is improved.

Various Additives

Any one of various additives may be blended into the polycarbonate resin composition (1) or (2) of the present invention as required to such an extent that an effect of the present invention is not impaired. Examples of the additives include: antioxidants such as a hindered phenol antioxidant, an ester antioxidant, a phosphate antioxidant, and an amine antioxidant; UV absorbers such as a benzotriazole UV absorber, a benzophenone UV absorber, a malonate UV absorber, and an oxalylanilide UV absorber; light stabilizers such as a hindered amine light stabilizer; internal lubricants such as an aliphatic carboxylate internal lubricant, a paraffin internal lubricant, a silicone oil, and a polyethylene wax; flowability improvers each composed of a copolymer of styrene and an acrylic compound; and flame retardants, flame retardant aids, release agents, antistatic agents, and colorants in common use.

The polycarbonate resin composition (1) or (2) of the present invention can be obtained by blending the above-mentioned respective components and melting and kneading the mixture as required. Ordinary methods can be adopted for the blending and the melting and kneading, and can be performed with, for example, a ribbon blender, a Henschel mixer (trade name), a Banbury mixer, a drum tumbler mixer, a single screw extruder, a twin screw extruder, a Ko-kneader, or a multi-axial screw extruder. An appropriate temperature at which the mixture is heated at the time of the melting and kneading is typically 250 to 300° C.

The polycarbonate resin composition (1) or (2) is suitable as a material for, for example, an optical molded body such as a light guide member typified by a light guide plate because the resin of the composition has significantly improved melt flowability and the retention stability of the composition in, for example, an injection molding machine is improved.

An optical molded body (optical molded article) of the present invention molded out of the polycarbonate resin composition (1) or (2) is used in, for example, a liquid crystal display field, an application of optical parts, or a glass alternative application. Examples of the optical parts include optical devices such as an optical lens and a light guide member. Examples of the glass alternative application include a street light cover and a laminated glass for vehicles and building materials.

Light Guide Member

A preferable example of the optical molded body of the present invention is a light guide member. The light guide member is of, for example, a plate-like shape, a rod-like shape, or a spherical shape; a light guide plate of the plate-like shape out of the shapes is preferable. An illumination unit of, for example, a plate-like shape, a rod-like shape, or a spherical shape can be constituted by causing the light guide member to guide light from, for example, a light emitting diode (which may hereinafter be referred to as "LED") as a light source. The illumination unit can be suitably used as an illumination or design part in a liquid crystal display apparatus, vehicle, housing, or interior.

Light Guide Plate

The plate-like light guide plate as an example of the light guide member (optical molded article) is preferably produced by the injection molding of the polycarbonate resin composition. The injection molding is performed while the temperature of a cylinder of an injection molding machine is set to preferably about 240 to 400° C., or more preferably about 280 to 380° C. and the temperature of a mold of the molding machine is set to preferably about 50 to 130° C.

The dimensions and shape of the light guide plate are not particularly limited, and it is sufficient that a flat plate, curve plate, or the like having a thickness of about 0.1 to 3 mm, or preferably about 0.5 to 3 mm be molded out of the composition. That is, the shape of the light guide plate is not necessarily limited to a flat plate shape, and has only to be appropriately selected depending on a purpose and an application; for example, the light guide plate may be a curve plate having a lens effect.

In addition, a uniform sheet luminous body can be obtained by transferring a microprism onto one or both of the front surface and back surface of the light guide plate in order that a light scattering layer may be formed by using a stamper at the time of the molding of the plate out of the composition.

The above-mentioned microprism, which is not particularly limited, is preferably a regular tetrahedral one. In addition, the microprism has a height of preferably 10 to 300 μm, more preferably 20 to 200 μm, or particularly preferably 50 to 100 μm.

It should be noted that dot pattern printing can be performed, or the plate can be cut with a conical drill for the formation of the light scattering layer.

Illumination Unit

According to the present invention, there is also provided an illumination unit including a light guide member such as a light guide plate as an example of the optical molded body of the present invention and a light source. For example, an illumination unit composed of an edge type surface light source body such as a liquid crystal television set, a personal computer, or a display is formed by placing a light source on a thick portion of a wedge-shaped light guide plate. A self-illuminant such as a cold-cathode tube, an LED, or any other organic electroluminescence device as well as a fluorescent lamp can be used as the light source. When the illumination unit of the present invention is adopted for a liquid crystal display apparatus, the mode according to which the unit emits light may be either a backlight mode or a frontlight mode.

EXAMPLES

Next, the present invention will be described in more detail by way of examples. However, the present invention is by no means limited by these examples.

It should be noted that various physical properties <performances> were measured in accordance with the following methods.

(1) Total Light Transmittance (Measurement of Transmittance and Haze)

A molded article measuring 35 mm long by 25 mm wide by 2.0 mm thick was produced by an injection molding, and its total light transmittance was measured with a direct-reading haze meter HGM-20DP manufactured by SUGA TEST INSTRUMENTS CO., LTD and a D 65 light source.

(2) Color Tone Evaluation (YI-1)

A molded article having a thickness of 2.0 mm was produced by injection molding, and its YI-1 value was measured by a transmission method with a spectrocolorimeter $\Sigma 90$ manufactured by Nippon Denshoku Industries Co., Ltd. and a C2 light source having a measurement area of $30\phi$.

(3) Flowability of Pellet: Q Value (Melt Flowability (Q Value))

The amount of a molten resin (mL/sec) flowing out of a nozzle having a diameter of 1 mm and a length of 10 mm was measured with an elevated flow tester in conformance with JIS K7210 at 280° C. under a pressure of 15.7 MPa. A flow value (Q value) increases as the melt viscosity of the resin reduces.

(4) Viscosity Number

The viscosity number of a polycarbonate resin composition to be obtained in each example was measured in conformance with ISO 1628-4 (1999).

(5) Luminance (Light Conductivity)

Measuring apparatus: An edge type surface light source having a reflecting film placed on its bottom surface and four LED's placed at its ends was formed. A light guide plate was placed on the light source so that the prism pattern of the plate was on a lower surface side. One diffusing film and two luminance improving films were sequentially laminated on the resultant, whereby a sheet luminous body was constituted.

A voltage of 3.25 V per LED was applied so that each LED was lighted up at a current value of 10 mA. The luminance of outgoing light at the central portion of the light guide plate was measured with an Eye Scale 3 as a luminance/chromaticity measuring machine.

(6) Measurement of Chromaticity

Chromaticity differences (x, y) were determined from a difference (chromaticity difference) between the measured value of chromaticity at a position at a distance of 5 mm from a side opposite to a side on which light was incident and the measured value of chromaticity at a position at a distance of 5 mm from the side on which light was incident in the lighted state in the above section (5). The chromaticity differences are preferably small because the chromaticity difference between the portion on which light is incident and the portion opposite to the portion on which light is incident becomes small. Chromaticity measurement was performed with an Eye Scale 3 as a luminance/chromaticity measuring machine.

(7) Measurement of YI-2

A molded article measuring 35 mm long by 25 mm wide by 2.0 mm thick was produced by an injection molding, and its yl-2 value was measured by a reflection method with a spectrocolorimeter $\Sigma 90$ manufactured by Nippon Denshoku Industries Co., Ltd. and a C2 light source having a measurement area of $30\phi$.

Production Example 1

Step of synthesizing Polycarbonate Oligomer

Sodium dithionite was charged at a concentration of 2,000 ppm with respect to bisphenol A (which may hereinafter be abbreviated as "BPA") to be dissolved later into a 5.6 mass % aqueous solution of sodium hydroxide. BPA was dissolved in the mixture so that the concentration of BPA was 13.5 mass %. Thus, an aqueous solution of sodium hydroxide containing BPA was prepared.

The aqueous solution of sodium hydroxide containing BPA, methylene chloride, and phosgene were continuously passed through a tubular reactor having an inner diameter of 6 mm and a tube length of 30 m at flow rates of 40 L/hr, 15 L/hr, and 4.0 kg/hr, respectively.

The tubular reactor used here had a jacket portion based on a double tube, and the temperature at which a reaction liquid was discharged was kept at 40° C. or lower by passing cooling water through the jacket portion.

The reaction liquid ejected from the tubular reactor was continuously introduced into a tank reactor with a baffle having a swept-back blade and an internal volume of 40 L. Further, the aqueous solution of sodium hydroxide containing BPA, a 25 mass % aqueous solution of sodium hydroxide, water, and a 1 mass % aqueous solution of triethylamine were added to the liquid at flow rates of 2.8 L/hr, 0.07 L/hr, 17 L/hr, and 0.64 L/hr, respectively so that a reaction was performed. The reaction liquid flooding out of the tank reactor was continuously extracted, and was left at rest so that an aqueous phase was separated and removed, and a methylene chloride phase was collected.

A polycarbonate oligomer thus obtained was present at a concentration of 320 g/L, and had a chloroformate group at a concentration of 0.75 mol/L.

Polymerizing Step

15 L of the above oligomer solution, 9.0 L of methylene chloride, 191 g of p-tert-butylphenol (hereinafter abbreviated as "PTBP"), and 3.0 mL of triethylamine were fed into a 50 L tank reactor provided with a baffle board, a paddle type stirring blade, and a cooling jacket. While the mixture was stirred, a potassium hydroxide solution containing bisphenol M (which may hereinafter be abbreviated as "BPM") (solution prepared by dissolving 973 g of BPM in an aqueous solution prepared by dissolving 520 g of KOH and 1.9 g of sodium dithionite in 5.5 L of water) was charged into the mixture so that a reaction between the polycarbonate oligomer and BPM was performed for 10 minutes.

An aqueous solution of sodium hydroxide containing BPA (solution prepared by dissolving 513 g of BPA in an aqueous solution prepared by dissolving 306 g of NaOH and 1.0 g of sodium dithionite in 4.5 L of water) was added to the polymer liquid, and the mixture was subjected to a polymerization reaction for 50 minutes.

10 L of methylene chloride for dilution were charged into the mixture, and the whole was stirred for 10 minutes. After that, the resultant was separated into an organic phase containing polycarbonate and an aqueous phase containing excessive amounts of BPA and NaOH, and the organic phase was isolated.

A solution of the polycarbonate copolymer in methylene chloride thus obtained was sequentially washed with an aqueous solution of NaOH having a concentration of 0.03 mol/L and hydrochloric acid having a concentration of 0.2 mol/L, the aqueous solution and hydrochloric acid each having a volume corresponding to 15 vol % of the volume of the solution of the polycarbonate copolymer. Next, the resultant was repeatedly washed with pure water until an electric conductivity in an aqueous phase after the washing became 0.01 μS/m or less.

The solution of the polycarbonate copolymer in methylene chloride obtained by the washing was concentrated and pulverized, and the resultant flake was dried under reduced pressure at 100°, whereby a copolymer (a) was obtained.

A molar ratio between repeating structural units each derived from BPM and repeating structural units each derived from BPA in the copolymer determined by $^{13}$C-NMR was 12:88.

Production Example 2

A PC copolymer (b) was obtained in the same manner as in Production Example 1 except that the addition amount of the aqueous solution of potassium hydroxide containing bisphenol M was changed as described below; and the addition of the aqueous solution of sodium hydroxide containing bisphenol A was not performed.

A molar ratio between repeating structural units each derived from BPM and repeating structural units each derived from BPA in the copolymer determined by $^{13}$C-NMR was 22:78.

(Aqueous Solution of Potassium Hydroxide Containing Bisphenol M)

A solution prepared by dissolving 1,738 g of bisphenol M in an aqueous solution prepared by dissolving 957 g of KOH and 1.9 g of sodium dithionite in 5.5 L of water Production Example 3

A PC copolymer (c) was obtained in the same manner as in Production Example 2 except that the addition amount of PTBP was changed from 191 g to 160 g.

A molar ratio between repeating structural units each derived from bisphenol M and repeating structural units each derived from bisphenol A in the copolymer determined by $^{13}$C-NMR was 22:78.

Production Example 4

A copolymer (d) was obtained in the same manner as in Production Example 1 except that the addition amount of each of the aqueous solution of potassium hydroxide containing bisphenol M, the aqueous solution of sodium hydroxide containing bisphenol A, and PTBP was changed as described below. A molar ratio between repeating structural units each derived from bisphenol M and repeating structural units each derived from bisphenol A in the copolymer determined by $^{13}$C-NMR was 8:92.

(Aqueous Solution of Potassium Hydroxide Containing Bisphenol M)

A solution prepared by dissolving 649 g of bisphenol M in an aqueous solution prepared by dissolving 347 g of KOH and 1.3 g of sodium dithionite in 3.7 L of water (Aqueous Solution of Sodium Hydroxide Containing Bisphenol A)

A solution prepared by dissolving 727 g of BPA in an aqueous solution prepared by dissolving 432 g of NaOH and 1.5 g of sodium dithionite in 6.3 L of water (Addition Amount of PTBP)

200 g

Examples 1 to 7, and Comparative Examples 1 and 2

Raw materials were blended with each other at a composition ratio shown in Table 1, and the mixture was granulated with an extruder of 40 mm (with a vent at a resin temperature of 250° C., whereby each pellet was obtained.

It should be noted that raw material resin composition was as follows: any one of the copolymers (a) to (c) obtained in the production examples was used as the PC copolymer (A), a DIANAL BR83 (having a viscosity average molecular weight of 40,000) or BR87 (having a viscosity average molecular weight of 25,000) manufactured by Mitsubishi Rayon Co. Ltd. was used as the acrylic resin (B), and a CELLOXIDE 2021P manufactured by DAICEL CHEMICAL INDUSTRIES, LTD. was used as the alicyclic epoxy compound (C).

In addition, a polycarbonate resin composed only of BPA and having a viscosity number of 39.4 (TAFLON FN1500 manufactured by Idemitsu Kosan Co., Ltd.) was used as an aromatic polycarbonate resin.

In addition, an organopolysiloxane KR511 manufactured by Shin-Etsu Silicones (organopolysiloxane having a methoxy group and a vinyl group) was used as the polysiloxane compound (D).

Further, 0.05 part by mass of a phosphorus antioxidant ADEKASTAB PEP36 manufactured by ASAHI DENKA KOGYO K.K. was blended into each of all pellets of the examples and the comparative examples.

Light guide plates having different thicknesses were molded out of the resultant pellets with the following injection molding machine under conditions related to a cylinder temperature, a mold temperature, and an injection speed shown in Table 1.

Injection molding machine: SG100M-HP manufactured by SUMITOMO HEAVY INDUSTRIES, LTD.

Shape of light guide plate: A length of 54 mm, a width of 39 mm, and a thickness of 0.30 mm, 0.35 mm, or 0.50 mm Prism: V groove The light guide plates were each evaluated for each performance by any one of the above-mentioned methods. Table 1 summarizes the results of the evaluation of Examples 1 to 7, and Comparative Examples 1 and 2.

TABLE 1

Examples of molding and evaluation of thin light guide plates

|  |  |  |  | Example 1 | Example 2 | Example 3 | Example 4 | Example 5 | Example 6 | Example 7 | Comparative Example 1 | Comparative Example 2 |
|---|---|---|---|---|---|---|---|---|---|---|---|---|
| Resin compo- sition | (A) | Copolymer (A) | Parts by mass | 100 |  | 100 | 100 |  |  | 100 | 100 | 100 |
|  |  | Copolymer (B) |  |  | 50 |  |  | 100 |  |  |  |  |
|  |  | Copolymer (C) |  |  |  |  |  |  | 100 |  |  |  |
|  | PC | FN1500 |  |  | 50 |  |  |  |  |  |  |  |
|  | (B) | BR83 |  | 0.20 | 0.10 | 0.10 |  | 0.10 | 0.10 | 0.10 |  |  |
|  |  | BR87 |  |  |  |  | 0.10 |  |  |  |  |  |
|  | (C) | 2021P |  |  |  |  |  |  | 0.01 |  |  |  |

TABLE 1-continued

Examples of molding and evaluation of thin light guide plates

|  |  |  | Example 1 | Example 2 | Example 3 | Example 4 | Example 5 | Example 6 | Example 7 | Comparative Example 1 | Comparative Example 2 |
|---|---|---|---|---|---|---|---|---|---|---|---|
| (D) | KR511 | | | | 0.10 | 0.10 | 0.10 | | 0.10 | | |
| | PEP36 | | 0.05 | 0.05 | 0.05 | 0.05 | 0.05 | 0.05 | 0.05 | 0.05 | 0.05 |
| | Total light transmittance | | 92.3 | 91.5 | 91.9 | 91.9 | 92.0 | 91.7 | — | 90.0 | — |
| | YI-1 | | 1.2 | 1.2 | 1.2 | 1.2 | 1.2 | 1.2 | — | 1.3 | — |
| | Q value | | 60 | 70 | 60 | 60 | 71 | 51 | — | 36 | — |
| Conditions for molding of light guide plate | Cylinder temperature | °C. | 330 | 330 | 330 | 330 | 325 | 330 | 345 | 365 | 365 |
| | Mold temperature | °C. | 120 | 120 | 120 | 120 | 100 | 120 | 120 | 365 | 365 |
| | Injection speed | mm/sec | 1,900 | 1,900 | 1,900 | 1,900 | 1,900 | 1,900 | 1,900 | 2,000 | 2,000 |
| Light guide plate | Thickness on gate side | mm | 0.35 | 0.35 | 0.35 | 0.35 | 0.35 | 0.50 | 0.30 | 0.35 | — |
| | Thickness on side opposite to gate side | mm | 0.35 | 0.35 | 0.35 | 0.35 | 0.35 | 0.50 | 0.30 | 0.35 | — |
| | Luminance | cd/m$^2$ | 1,840 | 1,810 | 1,850 | 1,830 | 1,850 | 1,820 | 1,840 | 1,590 | — |
| | Chromaticity differences | x | 0.01> | 0.01> | 0.01> | 0.01> | 0.01> | 0.01> | 0.01> | 0.0170 | — |
| | | y | 0.01> | 0.01> | 0.01> | 0.01> | 0.01> | 0.01> | 0.01> | 0.0252 | — |
| Copolymer | BPM:BPA (Repeating unit) Molar ratio | | 12:88 | ← | ← | ← | ← | 22:78 | ← | 0:100 | 0:100 |
| | Viscosity number | | 39.4 | ← | ← | ← | ← | 43.9 | ← | 39.4 | 39.4 |

In Comparative Example 2, raw materials for a light guide plate having a thickness of 0.30 mm could not be loaded (could not be molded into the plate).

As shown in Table 1, the results of the examples reveal that the polycarbonate resin composition of the present invention can be molded into a plate as thin as 0.30 mm by injection molding with good flowability at a low cylinder temperature and a low injection speed. In addition, the light guide plates of the examples each have such high performance as described below: each plate has a luminance of 1,800 (cd/m$^2$) or more and chromaticity differences each of which is as small as 0.01 or less.

Examples 8 to 16, and Comparative Examples 3 to 5

As Examples 8 to 16, raw materials were blended with each other at a composition ratio shown in Table 2, and the mixture was molten kneaded and extruded with an single screw extruder of 40 mmϕ with a vent at a resin temperature of 280° C. and a screw rotation speed of 100 rpm, whereby each pellet was obtained. Table 2 shows the kind of a polycarbonate resin composition used, the content (mol %) of bisphenol M, and the results of the measurement of the viscosity number and Q value of each pellet. In addition, a light guide plate measuring 54 mm long by 39 mm wide by 0.03 mm, 0.35 mm, or 0.50 mm thick and having a V-groove prism was molded out of each of the resultant pellets by an injection molding, and was evaluated for its total light transmittance, YI-2 value, luminance, and chromaticity differences. Table 2 shows the results.

Injection molding machine: SG100M-HP manufactured by SUMITOMO HEAVY INDUSTRIES, LTD.

<Shape of Light Guide Plate>

In addition, raw materials were blended with each other at a composition ratio shown in Table 3 in conformance with Examples 8 to 16, whereby pellets as Comparative Examples 3 to 5 were obtained. A light guide plate was molded out of each of the resultant pellets in conformance with Examples 8 to 16, and was evaluated for its total light transmittance, YI-2 value, luminance, and chromaticity differences. Table 3 shows the results. It should be noted that the term "FN1500" as used in Tables 2 and 3 represents an aromatic polycarbonate resin (manufactured by Idemitsu Kosan Co., Ltd.).

In addition, in the examples and the comparative examples, the following polyorganosiloxanes were used:
(1) a KF56 (trade name, manufactured by Shin-Etsu Chemical Co., Ltd.);
(2) an SH556 (trade name, manufactured by Dow Corning Toray Co., Ltd.); and
(3) a DC3037 (trade name, manufactured by Dow Corning Toray Co., Ltd.).

TABLE 2

|  |  |  | Example 8 | Example 9 | Example 10 | Example 11 | Example 12 | Example 13 | Example 14 | Example 15 | Example 16 |
|---|---|---|---|---|---|---|---|---|---|---|---|
| Resin composition | Copolymer(a) | Parts by mass | 100 | 100 | | 100 | 100 | 100 | | | |
| | Copolymer (b) | | | | 50 | | | | | 100 | |
| | Copolymer(c) | | | | | | | | | | 100 |
| | Copolymer(d) | | | | | | | | 100 | | |
| | FN1500 | | | | 50 | | | | | | |
| | PEP36 | Part | 0.05 | 0.05 | 0.05 | 0.05 | 0.05 | 0.05 | 0.05 | 0.05 | 0.05 |

TABLE 2-continued

| | | | Example 8 | Example 9 | Example 10 | Example 11 | Example 12 | Example 13 | Example 14 | Example 15 | Example 16 |
|---|---|---|---|---|---|---|---|---|---|---|---|
| | | by mass | | | | | | | | | |
| | KF56 | | 0.10 | 0.10 | 0.10 | 0.02 | 0.50 | | | 0.10 | 0.10 |
| | SH556 | | | | | | | | 0.10 | | |
| | DC3037 | | | | | | | | 0.05 | | |
| Physical property values | Total light transmittance | | 91.3 | 91.3 | 91.3 | 91.1 | 90.3 | 91.1 | 90.3 | 91.2 | 91.2 |
| | YI-2 | | 1.2 | 1.2 | 1.2 | 1.2 | 1.2 | 1.2 | 1.2 | 1.2 | 1.2 |
| | Q value | | 59 | 59 | 59 | 59 | 60 | 59 | 60 | 69 | 49 |
| Conditions for molding of light guide plate | Cylinder temperature | °C. | 330 | 330 | 330 | 330 | 330 | 330 | 330 | 325 | 345 |
| | Mold temperature | °C. | 120 | 120 | 120 | 120 | 120 | 120 | 120 | 120 | 120 |
| | Injection speed | mm/sec | 1,900 | 1,900 | 1,900 | 1,900 | 1,800 | 1,900 | 1,900 | 1,900 | 1,900 |
| Light guide plate | Thickness on gate side | mm | 0.35 | 0.30 | 0.35 | 0.35 | 0.35 | 0.35 | 0.35 | 0.35 | 0.50 |
| | Thickness on side opposite to gate side | mm | 0.35 | 0.30 | 0.35 | 0.35 | 0.35 | 0.35 | 0.35 | 0.35 | 0.50 |
| | Luminance | | 1,810 | 1,810 | 1,810 | 1,800 | 1,800 | 1,810 | 1,810 | 1,810 | 1,800 |
| | Chromaticity differences | x | 0.01> | 0.01> | 0.01> | 0.01> | 0.01> | 0.01> | 0.01> | 0.01> | 0.01> |
| | | y | 0.01> | 0.01> | 0.01> | 0.01> | 0.01> | 0.01> | 0.01> | 0.01> | 0.01> |
| Copolymer(A) | BPM:BPA | Molar ratio | 12:88 | 12:88 | 12:88 | 12:88 | 12:88 | 12:88 | 8:92 | 22:78 | 22:78 |
| | Viscosity number | | 39.4 | 39.4 | 39.4 | 39.4 | 39.4 | 39.4 | 39.4 | 39.4 | 43.9 |
| Resin composition | Viscosity number | | 39.4 | 39.4 | 39.6 | 39.2 | 39.4 | 39.6 | 39.3 | 39.4 | 43.9 |

TABLE 3

| | | | Comparative Example 3 | Comparative Example 4 | Comparative Example 5 |
|---|---|---|---|---|---|
| Resin composition | Copolymer(A) | Parts by mass | | | 100 |
| | Copolymer(B) | | | | |
| | Copolymer(C) | | | | |
| | FN1500 | | 100 | 100 | |
| | PEP36 | Part by mass | 0.05 | 0.05 | 0.05 |
| | KF56 | | | | 3.0 |
| | SH556 | | | | |
| | SH550 | | | | |
| Physical property values | Total light transmittance | | 90.0 | — | 87.0 |
| | YI-2 | | 1.3 | — | — |
| | Q value | | 36 | 36 | 40 |
| Conditions for molding of light guide plate | Cylinder temperature | °C. | 365 | 365 | — |
| | Die temperature | °C. | 365 | 365 | — |
| | Injection speed | mm/sec | 2,000 | 2,000 | — |
| Light guide plate | Thickness on gate side | mm | 0.35 | — | — |
| | Thickness on side opposite to gate side | mm | 0.35 | — | — |
| | Luminance | | 1,590 | — | — |
| | Chromaticity differences | x | 0.0170 | — | — |

In Comparative Example 2, raw materials for a light guide plate having a thickness of 0.30 mm could not be loaded.

INDUSTRIAL APPLICABILITY

The use of the polycarbonate resin composition of the present invention as a material for an optical molded article such as a light guide plate can provide a thin light guide plate which is free of yellowing due to the thermal deterioration of the resin of the composition and which has good light conducting performance and sufficient moldability. The light guide plate can be suitably utilized in, for example, an optical device such as a light guide plate in a liquid crystal display field, a backlight for a liquid crystal display apparatus, or a glass alternative application such as a street light cover or a laminated glass for vehicles and building materials.

The invention claimed is:

1. A polycarbonate resin composition comprising:
a polycarbonate resin comprising a polycarbonate copolymer (A) having a viscosity number of 30 to 43.9 and comprising repeating structural units represented by the following formulae (I) and (II) in a mole ratio of (I) to (II) of 1:99 to 22:78:

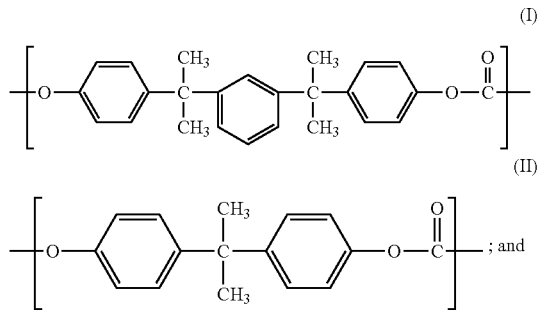

a polyorganosiloxane (D) comprising one or more of an alkoxy group, a vinyl group, a phenyl group, and a biphenyl group, the polyorganosiloxane being blended in said composition an amount of 0.01 to 1 part by mass into 100 parts by mass of the polycarbonate resin.

2. The polycarbonate resin composition according to claim 1, wherein the polycarbonate copolymer (A) has a viscosity number of 39.4 to 43.9.

3. The polycarbonate resin composition according to claim 1, wherein the polycarbonate copolymer (A) comprises the repeating structural units represented by formula (I) and formula (II) in a molar ratio of 12:88-22:78.

4. The polycarbonate resin composition according to claim 3, wherein the polycarbonate copolymer (A) has a viscosity number of 39.4 to 43.9.

5. The polycarbonate resin composition according to claim 4, wherein the polycarbonate resin consists of polycarbonate copolymer (A).

6. The polycarbonate resin composition according to claim 5, wherein polyorganosiloxane (D) is a polyorganosiloxane having a viscosity at 25° C. of 1 to 150 mm$^2$/sec.

7. The polycarbonate resin composition according to claim 1, further comprising a phosphorus stabilizer (E) blended in said composition in an amount of 0.001 to 0.5 part by mass into 100 parts by mass of the polycarbonate resin.

8. The polycarbonate resin composition according to claim 1, further comprising an alicyclic epoxy compound (C) blended in said composition in an amount of 0.001 to 1 part by mass into 100 parts by mass of the polycarbonate resin.

9. The polycarbonate resin composition according to claim 1, further comprising an aromatic polycarbonate resin other than polycarbonate copolymer (A).

10. The polycarbonate resin composition according to claim 1, wherein the polycarbonate resin composition has a viscosity number of 30 to 70.

11. An optical molded body, which is obtained by molding the polycarbonate resin composition according to claim 1.

12. The optical molded body according to claim 11, wherein the optical molded body comprises a light guide member.

13. The optical molded body according to claim 12, wherein the light guide member comprises a light guide plate.

14. The optical molded body according to claim 13, wherein the light guide plate has a thickness of 0.1 to 3 mm.

15. An illumination unit, comprising:
the optical molded body according to claim 12; and
a light source.

16. The polycarbonate resin composition according to claim 1, wherein the polycarbonate resin consists of polycarbonate copolymer (A).

17. The polycarbonate resin composition according to claim 1, wherein polyorganosiloxane (D) is a polyorganosiloxane having a kinetic viscosity at 25° C. of 1 to 1,000 mm$^2$/sec.

18. The polycarbonate resin composition according to claim 1, wherein polyorganosiloxane (D) is a polyorganosiloxane having a viscosity at 25° C. of 1 to 150 mm$^2$/sec.

* * * * *